United States Patent
Sekiguchi (10) Patent No.: US 9,726,207 B2
(45) Date of Patent: Aug. 8, 2017

(54) WORKPIECE POSITIONING STRUCTURE AND WORKPIECE POSITIONING METHOD

(71) Applicant: TOYOTA JIDOSHA KABUSHIKI KAISHA, Toyota-cho, Toyota-shi, Aichi-ken (JP)

(72) Inventor: Tomohiko Sekiguchi, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 57 days.

(21) Appl. No.: 14/382,387

(22) PCT Filed: Mar. 5, 2013

(86) PCT No.: PCT/IB2013/000498
§ 371 (c)(1),
(2) Date: Sep. 2, 2014

(87) PCT Pub. No.: WO2013/132318
PCT Pub. Date: Sep. 12, 2013

(65) Prior Publication Data
US 2015/0104240 A1    Apr. 16, 2015

(30) Foreign Application Priority Data
Mar. 7, 2012   (JP) .................................. 2012-050328

(51) Int. Cl.
*F16B 5/07* (2006.01)
*F16B 5/06* (2006.01)

(52) U.S. Cl.
CPC .............. *F16B 5/07* (2013.01); *F16B 5/0642* (2013.01); *F16B 5/0664* (2013.01); *Y10T 29/49826* (2015.01); *Y10T 403/1624* (2015.01)

(58) Field of Classification Search
CPC .... F16B 5/0004; F16B 5/0008; F16B 5/0032; F16B 5/0036; F16B 5/0056; F16B 5/0664;
(Continued)

(56) References Cited

U.S. PATENT DOCUMENTS 2,251,644 A * 8/1941 Tinnerman ................ F16L 3/13
                                                        248/73
2,379,896 A * 7/1945 Fitzgerald, Jr. .......... F16B 5/06
                                                        24/593.1
(Continued)

FOREIGN PATENT DOCUMENTS

EP    1 923 577 A1    5/2008
JP    57-202265 U     6/1981
(Continued)

OTHER PUBLICATIONS

Partial English Translation of Notification of Reasons for Refusal dated Mar. 25, 2015, issued by the Japanese Patent Office in counterpart Japanese application No. 2012-050328.
(Continued)

*Primary Examiner* — Joshua J Michener
*Assistant Examiner* — Keith Minter
(74) *Attorney, Agent, or Firm* — Sughrue Mion, PLLC (57) ABSTRACT

A positioning structure that positions two workpieces includes a one positioning portion that is provided on one of the workpieces and includes one inverted portion and a protruding portion; and a other positioning portion that is provided on the other workpiece and includes another inverted portion and a receiving portion, the two positioning portions positioning the two workpieces, by overlapping an end portion of the one positioning portion face-to-face with an end portion of the other positioning portion. The two inverted portions are each such that alignment of the posi-
(Continued)

tioning portion is inverted when the one positioning portion is overlapped with the other positioning portion, the protruding portion is arranged on the end portion side of the one positioning portion and is provided protruding toward an overlapping side, and the receiving portion engages with the protruding portion when the one positioning portion is overlapped with the other positioning portion.

14 Claims, 4 Drawing Sheets

(58) Field of Classification Search
CPC .... F16B 5/0642; F16B 5/0621; F16B 5/0607; F16B 5/06; F16B 5/07; Y10T 403/70; Y10T 403/7045; Y10T 403/7073; Y10T 403/1624; Y10T 29/49826
USPC .................................................. 403/408.1, 14
See application file for complete search history.

(56) References Cited

U.S. PATENT DOCUMENTS

| | | | | | |
|---|---|---|---|---|---|
| 2,429,284 | A | * | 10/1947 | Wildhaber | F16D 11/14 192/69.8 |
| 2,497,523 | A | * | 2/1950 | Warkentin | H01R 13/28 403/364 |
| 3,221,466 | A | * | 12/1965 | Downing, Jr. | E04B 9/10 403/219 |
| 3,297,345 | A | | 1/1967 | Downing, Jr. | |
| 3,482,289 | A | * | 12/1969 | Stradella | A63B 33/002 24/20 EE |
| 3,898,784 | A | * | 8/1975 | Sauer | E04B 9/10 403/327 |
| 4,531,340 | A | * | 7/1985 | Sauer | E04B 9/10 403/393 |
| 4,745,666 | A | * | 5/1988 | Murphy | E04C 3/07 24/295 |
| 5,176,482 | A | * | 1/1993 | Reinl | F16B 5/025 403/387 |
| 5,558,458 | A | * | 9/1996 | Silvis | F16B 5/0036 403/384 |
| 5,678,948 | A | * | 10/1997 | White | A47B 1/00 108/64 |
| 6,729,100 | B2 | * | 5/2004 | Koski | E04B 9/068 403/346 |
| 6,921,227 | B1 | * | 7/2005 | De Jong | B60J 7/192 292/80 |
| 2009/0290933 | A1 | * | 11/2009 | Skrabs | F16D 1/112 403/329 |
| 2011/0017742 | A1 | * | 1/2011 | Sausen | B65D 11/188 220/324 |
| 2015/0353041 | A1 | * | 12/2015 | Kojima | F16B 5/0664 293/155 |

FOREIGN PATENT DOCUMENTS

| | | |
|---|---|---|
| JP | 59-195773 U | 12/1984 |
| JP | 6037290 U | 3/1985 |
| JP | 61-165864 U | 10/1986 |
| JP | 446580 U | 4/1992 |
| JP | 5-12718 U | 2/1993 |
| JP | 6302172 A | 10/1994 |
| JP | 8-121444 A | 5/1996 |
| JP | 2008-062268 A | 3/2008 |
| JP | 2008-116619 A | 5/2008 |
| JP | 2009-206153 A | 9/2009 |
| JP | 2011-098817 A | 5/2011 |
| WO | 02/18801 A1 | 3/2002 |
| WO | 2008/058765 A1 | 5/2008 |

OTHER PUBLICATIONS

Communication dated Sep. 14, 2016, from the Japanese Patent Office in counterpart application No. 2015-226651.

* cited by examiner

WORKPIECE POSITIONING STRUCTURE AND WORKPIECE POSITIONING METHOD

BACKGROUND OF THE INVENTION

1. Field of the Invention

The invention mainly relates to a positioning structure and a positioning method that positions two workpieces with respect to one another by overlapping positioning portions of the workpieces, with end portions thereof face-to-face.

2. Description of Related Art

Various positioning structures and positioning methods for positioning and assembling two workpieces have been proposed. For example, Japanese Patent Application Publication No. 2008-116619 (JP 2008-116619 A) describes a positioning structure that positions and assembles two workpieces without using a positioning jig. More specifically, claim 1 in JP 2008-116619 A describes a plate positioning structure that positions two plates with respect to each other by sandwiching a thin plate-like protruding portion formed on one plate, in a thickness direction between bulging portions formed opposite an inner portion of an open portion formed on the other plate. In this plate positioning structure, the bulging portions include at least one one-side bulging portion that abuts against one surface of the protruding portion, and an other-side bulging portion that bulges out opposite the one-side bulging portion on both the left and right sides sandwiching the one-side bulging portion, and abuts against the other surface of the protruding portion.

However, with the positioning structure according to JP 2008-116619 A, a positioning jig is not used, but sufficient interlocking force is unable to be obtained, and furthermore, the shape of the open portion that is formed on the other plate and has the plurality of bulging portions is complex, and the press die load-bearing capacity is reduced, so press-forming is not possible, which makes it difficult to employ.

SUMMARY OF THE INVENTION

The invention thus provides a workpiece positioning structure and positioning method capable of accurately positioning two workpieces with sufficient interlocking force, without using a positioning jig or the like.

Hereinafter, several aspects and modes of the invention will be described. The invention is to be construed considering the description associated with each aspect and mode and example embodiments and the like. Insofar as this construal allows, aspects and modes in which other constituent elements have been further added to each aspect and mode, and aspects and modes in which constituent elements have been omitted from each aspect and mode may also be aspects and modes of the invention.

A first aspect of the invention relates to a positioning structure that positions two workpieces that includes a plate-like one positioning portion that is provided on one of the workpieces and includes one inverted portion and a protruding portion; and a plate-like other positioning portion that is provided on the other workpiece and includes another inverted portion and a receiving portion, the one positioning portion and the other positioning portion positioning the one workpiece with respect to the other workpiece, by overlapping an end portion of the one positioning portion face-to-face with an end portion of the other positioning portion. The one inverted portion and the other inverted portion are each such that alignment of the positioning portion of each workpiece is inverted when the one positioning portion is overlapped with the other positioning portion, the protruding portion is arranged on the end portion side of the one positioning portion and is provided protruding toward an overlapping side that is a side on which the one positioning portion overlaps with the other positioning portion, and the receiving portion engages with the protruding portion provided on the one positioning portion when the one positioning portion is overlapped with the other positioning portion.

According to this aspect, two workpieces are able to be accurately positioned and assembled with sufficient interlocking force, without using a positioning jig or the like.

In the aspect described above, the alignment of the positioning portion of each workpiece being inverted may be the alignment of the positioning portion of each workpiece being arranged to realize a positional relationship that is reversed from the positional relationship of the workpieces, and the protruding portion being provided toward the overlapping side may be the protruding portion being provided on a surface opposing the other positioning portion when the one positioning portion is overlapped with the other positioning portion.

The positioning structure having the structure described above may also include a fixing portion provided on the one positioning portion, and the fixing portion may be arranged on a far side of the one positioning portion and continuous with the protruding portion, and engage with the end portion of the other positioning portion when the one positioning portion is overlapped with the other positioning portion.

According to this structure, the relative position of the workpieces in the vertical direction and the horizontal direction is determined by bringing the positioning portions of the workpieces together with the end portions thereof face-to-face and overlapping them via the inverted portions, and at the same time, engaging the end portion of the other positioning portion with the fixing portion provided on the one positioning portion, and engaging the protruding portion provided on the one positioning portion with the receiving portion provided on the other positioning portion. Moreover, sufficient interlocking force of the workpieces is able to be obtained because relative movement of the workpieces in the vertical direction and the horizontal direction is mechanically controlled.

Also, in the structure described above, the fixing portion may be arranged on an opposite side of the protruding portion from the end portion of the one positioning portion, and engage with the end portion of the other positioning portion when the one positioning portion is overlapped with the other positioning portion.

The positioning structure having the structure described above may also include a stopper portion provided on the one positioning portion, and a fixing portion provided on the one positioning portion. The stopper portion may be arranged on an opposite side of the fixing portion from the end portion of the one positioning portion, and may be provided on a surface opposing the other positioning portion when the one positioning portion is overlapped with the other positioning portion.

According to this structure, when bringing the positioning portions of the workpieces together with the end portions thereof face-to-face and overlapping them via the inverted portions, at the point at which the end surface of the other positioning portion abuts against the stopper portion provided on the one positioning portion, relative movement of the workpieces in a face-to-face direction (i.e., the direction in which the one positioning portion faces the other positioning portion) is restricted, and the end portion of the other positioning portion engages with the fixing portion provided on the one positioning portion, and the protruding portion provided on the one positioning portion engages with the receiving portion provided on the other positioning portion.

The positioning structure having the structure described above may also include a guide portion provided on the end portion of the other positioning portion, and the guide portion may have a cup shape that matches a top surface of the protruding portion provided on the one positioning portion.

According to this structure, when bringing the positioning portions of the workpieces together with the end portions thereof face-to-face and overlapping them via the inverted portions, a guide surface of the guide portion provided on the end portion of the other positioning portion is guided along the top surface of the protruding portion provided on the one positioning portion, and the end portion of the other positioning portion engages with the fixed portion provided on the one positioning portion, and the protruding portion provided on the one positioning portion engages with the receiving portion provided on the other positioning portion. The end portion that includes the guide portion of the other positioning portion smoothly engages with the fixing portion provided on the one positioning portion.

In the aspect described above, the protruding portion may be an annular flange portion that extends toward the overlapping side, and the receiving portion may engage with the annular flange portion provided on the one positioning portion when the one positioning portion is overlapped with the other positioning portion.

According to this structure, the relative position of the workpieces in the vertical direction and the horizontal direction is determined by bringing the positioning portions of the workpieces together with the end portions thereof face-to-face and overlapping them via the inverted portions, and at the same time, engaging the annular flange portion provided on the one positioning portion with the receiving portion provided on the other positioning portion. Moreover, sufficient interlocking force of the workpieces is able to be obtained because relative movement of the workpieces in the vertical direction and the horizontal direction is mechanically controlled.

In the structure described above, the protruding portion may have an annular flange portion provided opposite the other positioning portion when the one positioning portion is overlapped with the other positioning portion, and the receiving portion may engage with the annular flange portion provided on the one positioning portion when the one positioning portion is overlapped with the other positioning portion.

The positioning structure having the structure described above may also include a guide portion provided on the other positioning portion, and the guide portion may guide the annular flange portion provided on the one positioning portion to a receiving portion provided on the other positioning portion.

According to this structure, when bringing the positioning portions of the workpieces together with the end portions thereof face-to-face and overlapping them via the inverted portions, a tip end of the annular flange portion provided on the one positioning portion engages with the receiving portion provided on the other positioning portion along the guide portion, without interfering with the end portion of the other positioning portion.

In the structure described above, each of the workpieces may be a press-formed article.

According to this structure, when positioning press-formed articles with respect to each other, the press-formed articles are able to be accurately positioned, without using a positioning jig or the like.

Also, a second aspect of the invention relates to a positioning method for positioning one workpiece having one positioning portion with respect to another workpiece having another positioning portion, by overlapping an end portion of the one positioning portion face-to-face with an end portion of the other positioning portion, the one positioning portion and the other positioning portion each being provided with an inverted portion in which alignment of the positioning portion of each workpiece is inverted when the one positioning portion is overlapped with the other positioning portion, the one positioning portion including a protruding portion, and the other positioning portion including a receiving portion that engages with the protruding portion. The positioning method includes bringing the one positioning portion of the one workpiece and the other positioning portion of the other workpiece close together, with the end portion of the one positioning portion face-to-face with the end portion of the other positioning portion, and overlapping the one positioning portion with the other positioning portion via the inverted portions, and engaging the protruding portion provided on the one positioning portion with the receiving portion provided on the other positioning portion.

According to this aspect, two workpieces are able to be accurately positioned and assembled with sufficient interlocking force, without using a positioning jig or the like.

The positioning method according to this aspect may also include engaging the end portion of the other positioning portion with a fixing portion provided on the one positioning portion.

According to this structure, the relative position of the workpieces in the vertical direction and the horizontal direction is determined by bringing the positioning portions of the workpieces together with the end portions thereof face-to-face and overlapping them via the inverted portions, and engaging the end portion of the other positioning portion with the fixing portion provided on the one positioning portion, and engaging the protruding portion provided on the one positioning portion with the receiving portion provided on the other positioning portion.

In the structure described above, the protruding portion may be an annular flange portion provided on the one positioning portion, and engage the annular flange portion with the receiving portion provided on the other positioning portion.

According to this structure, the relative position of the workpieces in the vertical direction and the horizontal direction is determined by bringing the positioning portions of the workpieces together with the end portions thereof face-to-face and overlapping them via the inverted portions, and engaging the annular flange portion of the burring portion provided on the one positioning portion with the receiving portion provided on the other positioning portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A-1 is a plane view and FIG. 1A-2 is a cross sectional view taken along line 1A-2 of a workpiece positioning structure according to a first example embodiment of the invention, and shows an initial stage in the positioning of a positioning portion of each workpiece;

FIG. 1B-1 is a plane view and FIG. 1B-2 is a cross sectional view taken along line 1B-2 of a workpiece positioning structure according to the first example embodiment of the invention, and shows an intermediate stage in the positioning of the positioning portion of each workpiece;

FIG. 1C-1 is a plane view and FIG. 1C-2 is a cross sectional view taken along line 1C-2 of a work positioning structure according to the first example embodiment of the invention, and shows a final stage in the positioning of the positioning portion of each workpiece;

FIG. 2A-1 is a plane view and FIG. 2A-2 is a cross sectional view taken along line 2A-2 of a workpiece positioning structure according to a second example embodiment of the invention, and shows an initial stage in the positioning of a positioning portion of each workpiece;

FIG. 2B-1 is a plane view and FIG. 2B-2 is a cross sectional view taken along line 2B-2 of a work positioning structure according to the second example embodiment of the invention, and shows an intermediate stage in the positioning of the positioning portion of each workpiece;

FIG. 2C-1 is a plane view and FIG. 2C-2 is a cross sectional view taken along line 2C-2 of a workpiece positioning structure according to the second example embodiment of the invention, and shows a final stage in the positioning of the positioning portion of each workpiece;

FIG. 3A-1 is a plane view and FIG. 3A-2 is a cross sectional view taken along line 3A-2 of a workpiece positioning structure according to a third example embodiment of the invention, and shows an initial stage in the positioning of a positioning portion of each workpiece;

FIG. 3B-1 is a plane view and FIG. 3B-2 is a cross sectional view taken along line 3B-2 of a workpiece positioning structure according to the third example embodiment of the invention, and shows an intermediate stage in the positioning of the positioning portion of each workpiece;

FIG. 3C-1 is a plane view and 3C-2 is a cross sectional view taken along line 3C-2 of a workpiece positioning structure according to the third example embodiment of the invention, and shows a final stage in the positioning of the positioning portion of each workpiece.

DETAILED DESCRIPTION OF EMBODIMENTS

Figure 1A:
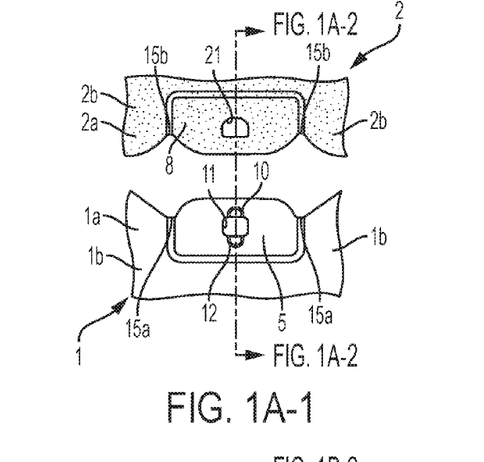

Hereinafter, example embodiments of the invention will be described in detail with reference to FIGS. 1A-1 to 4. First, a workpiece positioning structure according to a first example embodiment of the invention will be described with reference to FIG. 1A-1 to 1C-2. Workpieces 1 and 2 with which the workpiece positioning structure according to the first example embodiment is employed are press-formed articles. Positioning portions 1a and 2a that are positioned overlapped with one another are formed near an end portion of each of the workpieces 1 and 2, respectively. With this positioning structure, the positioning portions 1a and 2a are positioned overlapping, with the end portions thereof facing each other (i.e., face-to-face).

Figure 1A:
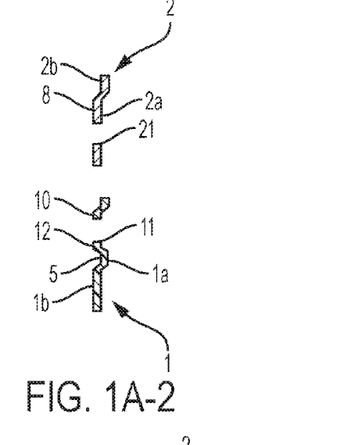

A recessed portion 5 that is recessed from a reference surface 1b of the positioning portion 1a is provided on an end portion of the positioning portion 1a of one workpiece 1, from among the two workpieces 1 and 2. The recessed portion 5 is formed by recessing the positioning portion 1a of the workpiece 1. Also, the recessed portion 5 corresponds to an inverted portion in which the alignment of the positioning portions 1a and 2a of the workpieces 1 and 2 is vertically inverted in a direction perpendicular to the reference surface 1b of the positioning portion 1a and a reference surface 2b of the positioning portion 2a. A boundary line between the recessed portion 5 and the reference surface 1b is formed such that an end portion 15a thereof is recessed toward the inside of the workpiece, i.e., in the direction opposite the direction in which the workpieces face each another. Also, a protruding portion 10 that extends toward the overlapping side, i.e., from a surface opposing the other workpiece 2 toward the other workpiece 2, is formed on a surface of the recessed portion 5 of the positioning portion 1a of the one workpiece 1. This protruding portion 10 is formed by deforming the positioning portion 1a in a cup shape. Accordingly, when the workpieces are press-formed articles, the protruding portion 10 is able to be easily formed. The protruding portion 10 is provided near the end portion of the positioning portion 1a. A curved arc-like portion of the protruding portion 10 points toward the end portion side of the positioning portion 1a. The protruding portion 10 is formed in a semicircular shape in a plan view when opposite the reference surface 1b or the surface of the recessed portion 5. One open portion 11 that serves as a fixing portion is formed continuous with the protruding portion 10, on the far side, i.e., the side opposite the end portion, of the positioning portion 1a. The one open portion 11 is formed vertically through the positioning portion 1a, i.e., through the reference surface 1b and the recessed portion 5. Accordingly, the positioning structure is easily formed. The one open portion 11 is formed in a rectangular shape in a plan view when opposite the reference surface 1b or the surface of the recessed portion 5. Furthermore, a stopper portion 12 is provided protruding on the far side, i.e., the side opposite the end portion, of the positioning portion 1a of the one workpiece 1, continuous with the one open portion 11, on the surface of the recessed portion 5 of the positioning portion 1a of the one workpiece 1. The stopper portion 12 is formed by deforming the positioning portion 1a in a cup shape in the same direction as the direction in which the protruding portion 10 is arranged. A curved arc-like portion of the stopper portion 12 points toward the far side, i.e., the side opposite the end portion, of the positioning portion 1a. The stopper portion 12 is formed in a semicircular shape in a plan view when opposite the reference surface 1b or the surface of the recessed portion 5. The outer diameters of the protruding portion 10 and the stopper portion 12 are formed substantially the same, and their heights with respect to the surface of the recessed portion 5 are also formed substantially the same. The one open portion 11 is formed in a rectangular shape. The length of the long sides is formed slightly greater than the outer diameter of the stopper portion 12 or the protruding portion 10, and the length of the short sides substantially matches the distance between the stopper portion 12 and the protruding portion 10.

A protruding portion 8 that protrudes from the reference surface 2b of the positioning portion 2a is provided on an end portion of the positioning portion 2a of the other workpiece 2, from among the two workpieces 1 and 2. The protruding portion 8 is formed by protruding the positioning portion 2a of the workpiece 2. Also, the protruding portion 8 corresponds to an inverted portion in which the alignment of the positioning portions 1a and 2a of the workpieces 1 and 2 is vertically inverted in a direction perpendicular to the reference surfaces 1b and 2b. A boundary line between the protruding portion 8 and the reference surface 2b is formed such that an end portion 15b thereof is recessed toward the inside of the workpiece, i.e., in the direction opposite the direction in which the workpieces face each other. Also, another open portion 21 that serves as a receiving portion is formed, in a position where the protruding portion 10 provided on the recessed portion 5 of the positioning portion 1a of the one workpiece 1 is arranged when the positioning portions 1a and 2a of the workpieces 1 and 2 are overlapped with each other, on the protruding portion 8 of the positioning portion 2a of the other workpiece 2. This other open portion 21 is formed vertically through the positioning portion 2a, i.e., through the reference surface 2b and the recessed portion 8. Accordingly, the positioning structure is easily formed. An arc-like curved portion of the other open portion 21 points toward the far side, i.e., the side opposite the end portion, of the positioning portion 2a. The other open portion 21 is formed in a D-shape in a plan view when opposite the reference surface 2b or the surface of the protruding portion 8. The opening width of the other open portion 21 in a direction along the end portion of the positioning portion 2a is formed slightly greater than the diameter of the protruding portion 10 provided on the positioning portion 1a of the one workpiece 1. The width between the other open portion 21 and the end portion of the positioning portion 2a, of the positioning portion 2a of the other workpiece 2 substantially matches an opening width of the one open portion 11 between the protruding portion 10 and the stopper portion 12, of the positioning portion 1a of the one workpiece 1. The length of the end portion of the positioning portion 1a at the recessed portion 5 of the positioning portion 1a of the one workpiece 1 is substantially the same as the length of the end portion of the positioning portion 2a at the protruding portion 8 of the positioning portion 2a of the other workpiece 2.

Next, a positioning method with the workpiece positioning structure according to the first example embodiment will be described with reference to FIGS. 1A to 1C. First, the positioning portions 1a and 2a of the workpieces 1 and 2 are brought together, with end portions thereof face-to-face, and are overlapped with the protruding portion 8 provided on the positioning portion 2a of the other workpiece 2 engaged with the recessed portion 5 provided on the positioning portion 1a of the one workpiece 1. As a result, a portion (i.e., an inverted portion) in which the alignment of the positioning portions 1a and 2a of the workpieces 1 and 2 is vertically inverted in a direction perpendicular to the reference surfaces 1b and 2b with respect to the overlapping relationship of the reference surfaces 1b and 2b is formed, such that the relative position in the vertical direction (perpendicular direction) of the workpieces 1 and 2 is determined, and the relative position in a direction along the end portions of the positioning portions 1a and 2a of the workpieces 1 and 2 is also determined. At the same time as this, a portion of the protruding portion 8 of the positioning portion 2a of the other workpiece 2, which is between the other open portion 21 and the end portion of the positioning portion 2a, moves while contacting a top surface of the protruding portion 10 provided on the recessed portion 5 of the positioning portion 1a of the one workpiece 1 until it finally interferes with the stopper portion 12 and engages with (i.e., catches on) the one open portion 11 between the protruding portion 10 and the stopper portion 12. At this time, the end portion of the positioning portion 2a of the other workpiece 2 tightly engages by contacting both the stopper portion 12 and the protruding portion 10 of the positioning portion of the one workpiece 1, in a state sandwiched between them (i.e., the stopper portion 12 and the protruding portion 10). Moreover, the protruding portion 10 provided on the recessed portion 5 of the positioning portion 1a of the one workpiece 1 engages with (i.e., fits into) the other open portion 21 provided on the protruding portion 8 of the positioning portion 2a of the other workpiece 2. As a result, the relative position in the direction in which the positioning portions 1a and 2a of the workpieces 1 and 2 face each other (hereinafter, also referred to as the "face-to-face direction") (i.e., a direction orthogonal to the direction along the end portions of the positioning portions 1a and 2a) is determined, and thus the relative position of the workpieces 1 and 2 in the horizontal direction is determined.

Figure 1B:
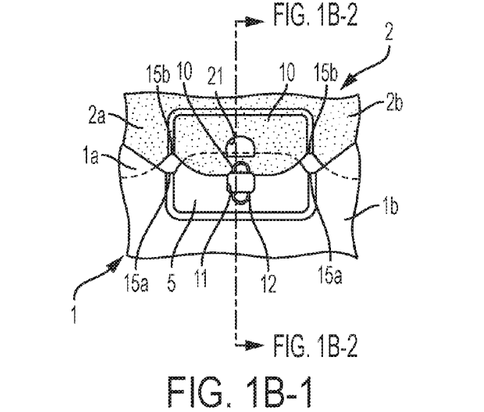
Figure 1B:
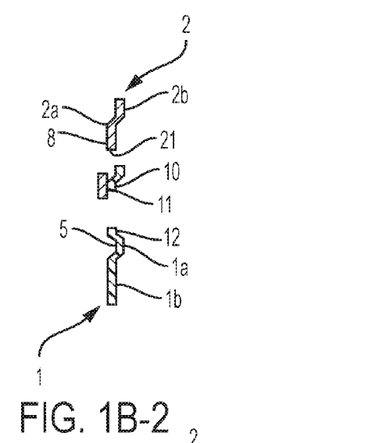
Figure 1C:
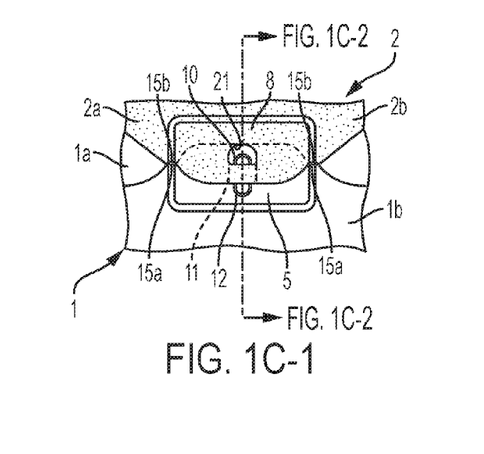
Figure 1C:
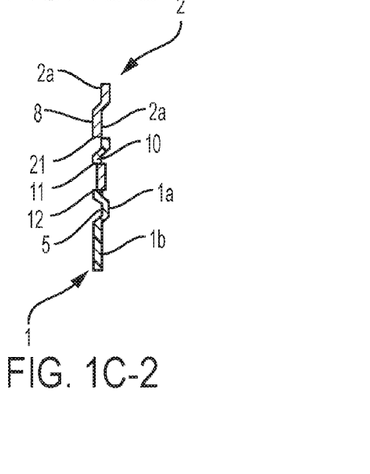

According to the first example embodiment of the invention described above, the relative position of the workpieces 1 and 2 in the vertical direction and the horizontal direction is determined by bringing the positioning portions 1a and 2a of the workpieces 1 and 2 together, with end portions thereof face-to-face, and overlapping the protruding portion 5 provided on the positioning portion 1a of the one workpiece 1 with the protruding portion 8 provided on the positioning portion 2a of the other workpiece 2 such that the two engage, and at the same time, engaging the end portion of the positioning portion 2a of the other workpiece 2 with (i.e., catching the end portion of the positioning portion 2a of the other workpiece 2 on) the one open portion 11 between the protruding portion 10 and the stopper portion 12 provided on the positioning portion 1a of the one workpiece 1, and engaging the protruding portion 10 provided on the positioning portion 1a of the one workpiece 1 with (i.e., fitting the protruding portion 10 provided on the positioning portion 1a of the one workpiece 1 into) the other open portion 21 provided in the positioning portion 2a of the other workpiece 2. In this way, the workpieces 1 and 2 are able to be accurately positioned without using a positioning jig.

Also, according to the first example embodiment of the invention, sufficient interlocking force of the workpieces 1 and 2 is able to be obtained because the relative positioning in the vertical direction and the horizontal direction of the workpieces 1 and 2 is mechanically constructed. As a result, the workpieces 1 and 2 are able to be transported in a state in which they are positioned and temporarily assembled. Also, the workpieces 1 and 2 are able to be positioned by a worker in any process, so the degree of freedom with respect to process layout and the division of work according to production changes increases.

Furthermore, in the first example embodiment of the invention, a worker is able to confirm that positioning of the workpieces 1 and 2 is complete when overlapping the positioning portions 1a and 2a of the workpieces 1 and 2, by an engaging sound produced when the end portion of the positioning portion 2a of the other workpiece 2 engages with (i.e., catches on) the one open portion 11 between the protruding portion 10 and the stopper portion 12 provided on the positioning portion 1a of the one workpiece 1, and the protruding portion 10 provided on the positioning portion 1a of the one workpiece 1 engages with (i.e., fits into) the other open portion 21 provided on the positioning portion 2a of the other workpiece 2, which improves productivity.

In addition, according to the first example embodiment of the invention, a dedicated holding jig that holds a subassembly that is formed of a plurality of workpieces and positioned as described above need simply be used at times such as when weld-assembling the positioned workpieces 1 and 2. Therefore, assembly is far simpler than it is when using dedicated holding jigs for holding each of the plurality of workpieces as in the related art. Furthermore, according to the first example embodiment of the invention, when a plurality of fixed welding machines are arranged at intervals in a welding line, it is possible for a worker to; for example, construct the subassembly by positioning a first workpiece and a second workpiece according to the positioning method described above, and weld the sub-assembled workpieces at predetermined positions using the first fixed welding machine, and then position a third workpiece on the welded workpieces according to the positioning method described above, and weld the sub-assembled workpieces at predetermined positions using the next fixed welding machine. This series of welding operations is able to be performed without using an elaborate dedicated jig or the like, so changes in the production volume can easily be handled, which leads to minimization of investment in production equipment.

In the first example embodiment, one recessed portion 5 having the protruding portion 10, the one open portion 11, and the stopper portion 12 is provided on the positioning portion 1a of the workpiece 1, and one protruding portion 8 having the other open portion 21 is provided on the positioning portion 2a of the workpiece 2, but the recessed portion 5 and the protruding portion 8 may also each by provided in plurality. Also, in the first example embodiment, the protruding portion 10, the one open portion 11, and the stopper portion 12 are provided on the recessed portion 5 of the positioning portion 1a of the one workpiece 1, and the other open portion 21 is provided on the protruding portion 8 of the positioning portion 2a of the other workpiece 2. Alternatively, however, the protruding portion 10, the one open portion 11, and the stopper portion 12 may be provided on the protruding portion 8 of the positioning portion 2a of the other workpiece 2, and the other open portion 21 may be provided on the recessed portion 5 of the positioning portion 1a of the one workpiece 1.

Furthermore, in the first example embodiment, the protruding portion 10, the one open portion 11, and the stopper portion 12 are formed in the region of the recessed portion 5 of the positioning portion 1a of the one workpiece 1, and the other open portion 21 is formed in the region of the protruding portion 8 of the positioning portion 2a of the other workpiece 2. However, the protruding portion 10, the one open portion 11, and the stopper portion 12 do not have to be provided in the region of the recessed portion 5 of the positioning portion 1a of the one workpiece 1. That is, the protruding portion 10, the one open portion 11, and the stopper portion 12 may instead be formed in another location (the reference surface 1b) of the positioning portion 1a of the one workpiece 1. Also, the other open portion 21 does not have to be provided in the region of the protruding portion 8 of the positioning portion 2a of the other workpiece 2. That is, the other open portion 21 need simply be formed in a position corresponding to the protruding portion 10, the one open portion 11, and the stopper portion 12 provided on the positioning portion 1a of the one workpiece 1, and thus may be formed at another location (the reference surface 2b) of the positioning portion 2a of the other workpiece 2.

Figure 2A:
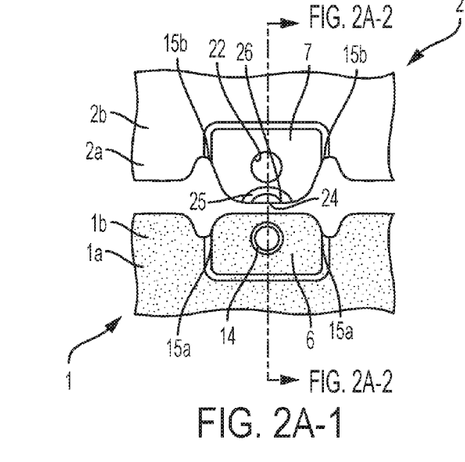
Figure 2A:
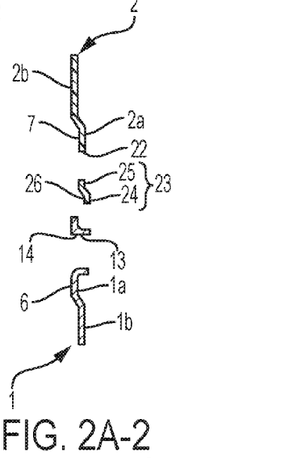

Next, a workpiece positioning structure according to a second example embodiment of the invention will be described with reference to FIGS. 2A-1 to 2C-1. In the description of the workpiece positioning structure according to this second example embodiment, only those points that differ from the workpiece positioning structure according to the first example embodiment ill be described. A burring portion 14 having an annular flange portion 13 that extends toward the overlapping side, i.e., from the surface opposing the other workpiece 2 toward the other workpiece 2, is formed on a lower surface of a protruding portion 6 that protrudes from the reference surface 1b of the positioning portion 1a of the one workpiece 1, i.e., on a surface opposite the direction toward which the protruding portion 6 protrudes from the reference surface 1b. Another open portion 22 that serves as a receiving portion is formed, in a position where the burring portion 14 that is provided on the protruding portion 6 of the positioning portion 1a of the one workpiece 1 is arranged when the one positioning portion 1a and the other positioning portion 2a are overlapped with each other, on a recessed portion 7 that is recessed from the reference surface 2b of the positioning portion 2a of the other workpiece 2. The inner diameter of the other open portion 22 substantially matches the outer diameter of the annular flange portion 13 of the burring portion 14. Also, a guide portion 23 that guides the annular flange portion 13 of the burring portion 14 provided on the positioning portion 1a of the one workpiece 1 to the other open portion 22 provided on the positioning portion 2a of the other workpiece 2 is formed on an end portion of the recessed portion 7 of the positioning portion 2a of the other workpiece 2. The guide portion 23 includes a sloped portion 25 that extends sloped in a direction opposite the overlapping side from the end portion of the recessed portion 7 of the positioning portion 2a of the other workpiece 2, i.e., in the direction opposite the surface side that opposes the one workpiece 1, and a flat portion 24 that is connected to a tip end of this sloped portion 25. The flat portion 24 is provided in a position where a tip end of the annular flange portion 13 of the burring portion 14 provided on the positioning portion 1a of the one workpiece 1 just abuts against the surface, or in a position where it will not interfere with the tip end, when the positioning portions 1a and 2a of the workpieces 1 and 2 are overlapped. The flat portion 24 is formed in a D-shape in a plan view when opposing the reference surface 2b or the surface of the recessed portion 7, including a linear end portion of the positioning portion 2a. Also, the sloped portion 25 is formed along a curved portion 26 of the flat portion 24 (i.e., a curved portion of the flat portion 24, which is positioned catty-corner to the linear end portion), and is formed connecting the surface of the recessed portion 7 to the curved portion 26 of the flat portion 24. The forming region of the sloped portion 25, which is in a position along the end portion of the positioning portion 2a, is set to the outside of the other open portion 22 provided on the positioning portion 2a of the other workpiece 2, when viewed from the face-to-face direction of the workpieces. The length of the end portion of the positioning portion 1a at the protruding portion 6 of the positioning portion 1a of the one workpiece 1 is substantially the same as the length of the end portion of the positioning portion 2a at the recessed portion 7 of the positioning portion 2a of the other workpiece 2. Accordingly, when the positioning portions of the workpieces 1 and 2 are brought together, with end portions thereof face-to-face, and overlapped with each other via the inverted portion, the tip end of the annular flange portion 13 of the burring portion 14 of the one positioning portion is guided to the receiving portion provided on the other positioning portion 2a along the sloped portion of the guide portion 23.

Figure 2B:
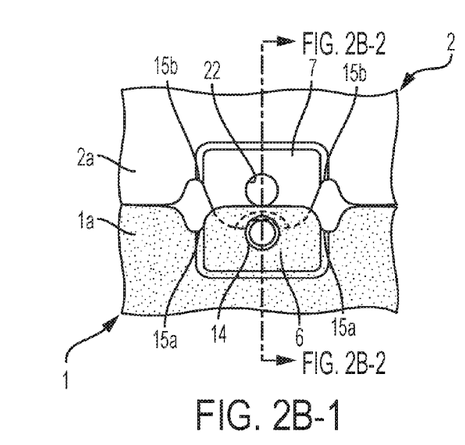
Figure 2B:
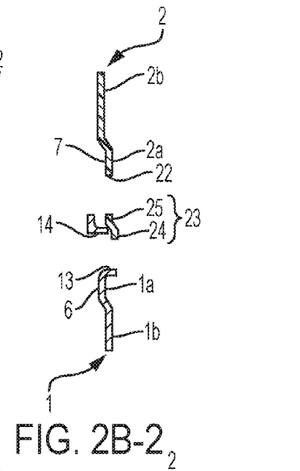
Figure 2C:
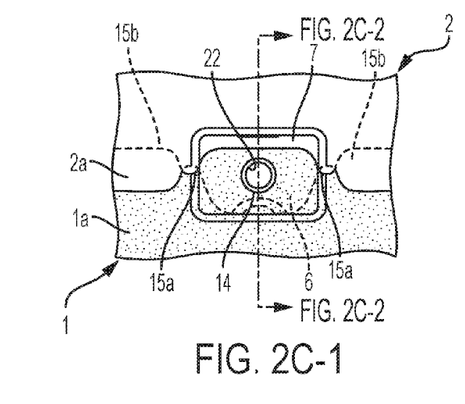
Figure 2C:
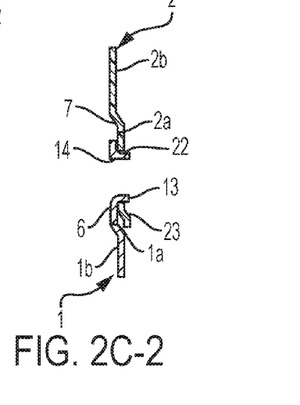

Next, a positioning method with the workpiece positioning structure according to the second example embodiment will be described. First, the positioning portions 1a and 2a of the workpieces 1 and 2 are brought together, with end portions thereof face-to-face, and are overlapped with the recessed portion 7 provided on the positioning portion 2a of the other workpiece 2 engaged with the protruding portion 6 provided on the positioning portion 1a of the one workpiece 1. As a result, a portion (i.e., an inverted portion) in which the alignment of the positioning portions 1a and 2a of the workpieces 1 and 2 is vertically inverted in a direction perpendicular to the reference surfaces 1b and 2b with respect to the overlapping relationship of the reference surfaces 1b and 2b is formed, so the relative position in the vertical direction (perpendicular direction) of the workpieces 1 and 2 is determined, and the relative position in a direction along the end portions of the positioning portions 1a and 2a of the workpieces 1 and 2 is also determined. At the same time as this, the annular flange portion 13 of the burring portion 14 provided on the positioning portion 1a of the one workpiece 1 reaches the surface of the recessed portion 7 along the sloped portion 25 and the flat portion 24 provided on the positioning portion 2a of the other workpiece 2, and the annular flange portion 13 ultimately tightly engages with (i.e., fits tightly into) the other open portion 22. As a result, the relative position in the horizontal direction of the workpieces 1 and 2 is determined. Also, this second example embodiment of the invention is also able to display similar operation and effects as those of the first example embodiment.

In the second example embodiment, the burring portion 14 that has the annular flange portion 13 is provided on the protruding portion 6 of the positioning portion 1a of the one workpiece 1, and the other open portion 22 and the guide portion 23 are provided on the recessed portion 7 of the positioning portion 2a of the other workpiece 2. Alternatively, however, the other open portion 22 and the guide portion 23 may be provided on the protruding portion 6 of the positioning portion 1a of the one workpiece 1, and the burring portion 14 having the annular flange portion 13 may be provided on the recessed portion 7 of the positioning portion 2a of the other workpiece 2.

Furthermore, in the second example embodiment, the burring portion 14 having the annular flange portion 13 is formed in the region of the protruding portion 6 of the positioning portion 1a of the one workpiece 1, and the other open portion 22 is formed in the region of the recessed portion 7 of the positioning portion 2a of the other workpiece 2. However, the burring portion 14 having the annular flange portion 13 does not have to be provided in the region of the protruding portion 6 of the positioning portion 1a of the one workpiece 1. That is, the burring portion 14 having the annular flange portion 13 may also be formed in another location (the reference surface 1b) of the positioning portion 1a of the one workpiece 1. Also, the other open portion 22 does not have to be provided in the region of the recessed portion 7 of the positioning portion 2a of the other workpiece 2. That is, the other open portion 22 need simply be formed in a position corresponding to the burring portion 14 having the annular flange portion 13 provided on the positioning portion 1a of the one workpiece 1, and thus may be formed at another location (the reference surface 2b) of the positioning portion 2a of the other workpiece 2.

Next, a workpiece positioning structure according to a third example embodiment of the invention will be described with reference to FIGS. 3A-1 to 3C-2. In the description of the workpiece positioning structure according to this third example embodiment, only those points that differ from the workpiece positioning structure according to the first example embodiment will be described. In the workpiece positioning structure according to the third example embodiment of the invention, a guide portion 27 is formed on an end portion of the protruding portion 8 of the positioning portion 2a of the other workpiece 2. The guide portion 27 is formed in a position opposite the other open portion 21, i.e., in a position on the same axis when viewed from the face-to-face direction of the workpieces. The guide portion 27 is formed by deforming the positioning portion 2a in a cup shape. The guide portion 27 is formed in a semicircular shape in a plan view when opposing the reference surface 2b or the surface of the protruding portion 8. A linear portion that constitutes a string that extends between the two ends of the semicircular shape is positioned on the end portion of the positioning portion 2a of the other workpiece 2. This guide portion 27 is formed having a larger diameter them the protruding portion 10 provided on the positioning portion 1a of the one workpiece 1, and a smaller diameter than the stopper portion 12. Accordingly, the end portion of the other positioning portion 2a is able to be smoothly guided by the guide portion 10 to the fixing portion provided on the one positioning portion 1a, thus improving workability.

Figure 3A:
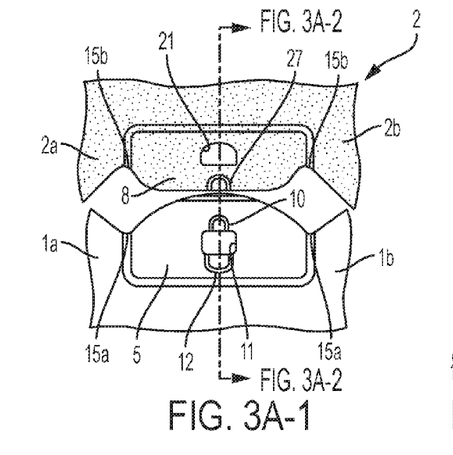
Figure 3A:
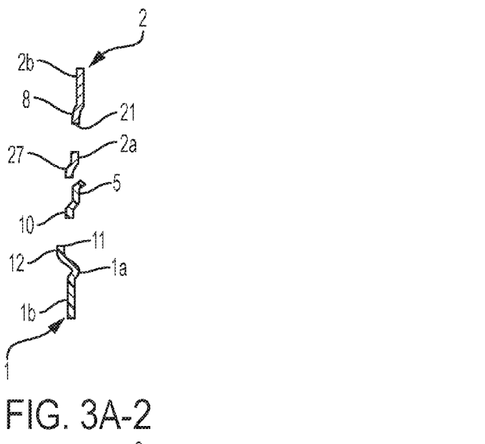

Also, with the workpiece positioning structure according to the third example embodiment, with the protruding portion 10 and the stopper portion 12 provided on the positioning portion 1a of the one workpiece 1, the stopper portion 12 is formed having a larger diameter, and higher with respect to the surface of the concave portion 5, than the protruding portion 10. Therefore, engagement between the end portion of the other positioning portion 2a and the fixing portion provided on the one positioning portion 1a, and engagement between the protruding portion 10 provided on the one positioning portion 1a and the receiving portion provided on the other positioning portion 2a are able to be smoothly achieved. The one open portion 11 is formed in a rectangular shape, but the length of the long sides that extend in a direction perpendicular to the face-to-face direction of the workpieces substantially matches the outer diameter of the stopper portion 12, and the length of the short sides that extend in the same direction as the face-to-face direction substantially matches the distance between the stopper portion 12 and the protruding portion 10.

Figure 3B:
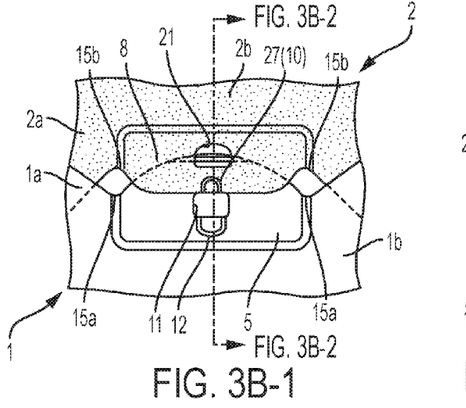
Figure 3B:
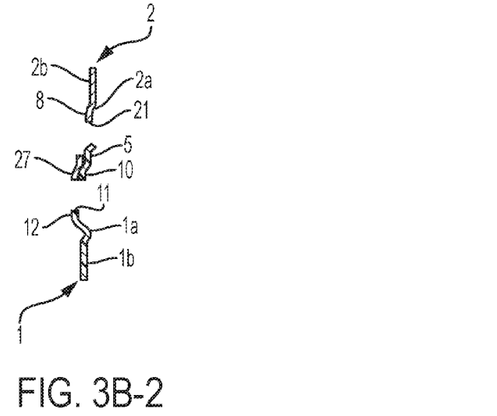
Figure 3C:
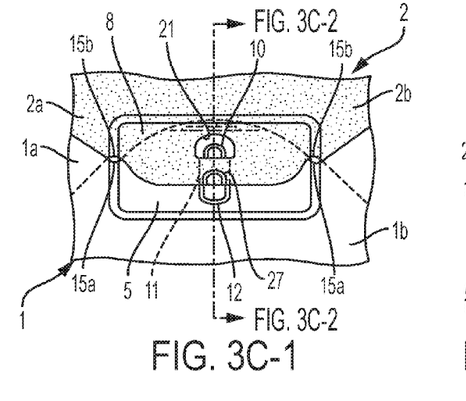
Figure 3C:
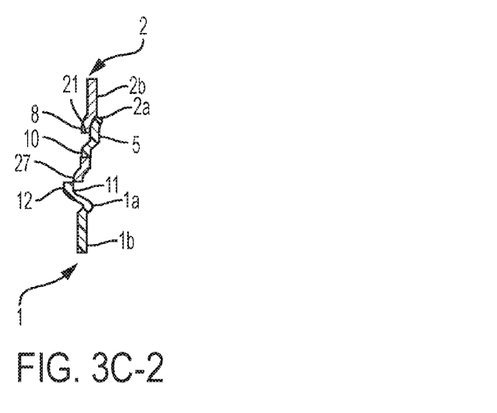

Next, a positioning method with the workpiece positioning structure according to the third example embodiment will be described. First, the positioning portions 1a and 2a of the workpieces 1 and 2 are brought together, with end portions thereof face-to-face, and are overlapped with the protruding portion 8 provided on the positioning portion 2a of the other workpiece 2 engaged with the recessed portion 5 provided on the positioning portion 1a of the one workpiece 1. As a result, a portion (i.e., an inverted portion) in which the alignment of the positioning portions 1a and 2a of the workpieces 1 and 2 is vertically inverted in a direction perpendicular to the reference surfaces 1b and 2b with respect to the overlapping relationship of the reference surfaces 1b and 2b is formed, such that the relative position in the vertical direction of the workpieces 1 and 2 is determined, and the relative position in a direction along the end portion of the positioning portions 1a and 2a of the workpieces 1 and 2 is also determined. At the same time as this, a recessed surface (spherical surface) of the guide portion 27 provided on the positioning portion 2a of the other workpiece 2 moves while contacting a top surface (a spherical surface) of the protruding portion 10 provided on the positioning portion 1a of the one workpiece 1, and an end portion that includes the guide portion 27 of the positioning portion 2a ultimately engages (i.e., catches on) the one open portion 11 between the protruding portion 10 and the stopper portion 12 provided on the positioning portion 1a of the one workpiece 1. At the same time, the protruding portion 10 provided on the positioning portion 1a of the one workpiece 1 engages with (i.e., fits into) the other open portion 21 provided on the positioning portion 2a of the other workpiece 2. As a result, the relative position in the direction in which the positioning portions 1a and 2a of the workpieces 1 and 2 face each other (i.e., in a direction orthogonal to the direction along the end portion of the positioning portions 1a and 2a) is determined, and thus the relative position in the horizontal direction of the workpieces 1 and 2 is determined.

Figure 4:
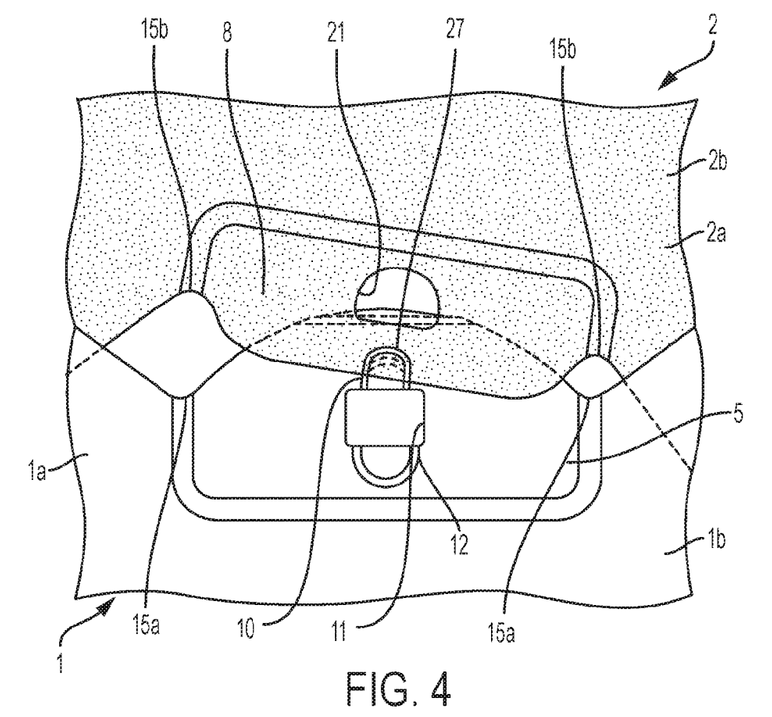
FIG. 4 is a view of the manner in which an overlapping direction of the workpieces is corrected when the overlapping direction is slightly off, in the third example embodiment of the invention.

Also, in the third example embodiment of the invention, in addition to the operation and effects of the first and second example embodiments, when the positioning portions 1a and 2a of the workpieces 1 and 2 are overlapped with the end portions thereof face-to-face, even if the direction in which they are overlapped is slightly off, the recessed surface of the guide portion 27 provided on the positioning portion 2a of the other workpiece 2 guides the workpiece 1 while correcting this direction to the proper direction by contacting the top surface of the protruding portion 10 provided on the positioning portion 1a of the one workpiece 1, as shown in FIG. 4. As a result, the positioning portions 1a and 2a of the workpieces 1 and 2 are able to be engaged in a proper state. Moreover, the guide portion 27 provided on the positioning portion 2a of the other workpiece 2 is formed having a larger diameter than the protruding portion 10 provided on the positioning portion 1a of the one workpiece 1, and a smaller diameter than the stopper portion 12 provided on the positioning portion 1a of the one workpiece 1. Therefore, the end portion that includes the guide portion 27 of the positioning portion 2a of the other workpiece 2 is able to be reliably engaged with (i.e., fit into) the one open portion 11 between the protruding portion 10 and the stopper portion 12 of the positioning portion 1a of the one workpiece 1.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A positioning structure that positions a first workpiece and a second workpiece, comprising:
   a first plate shaped positioning portion provided on the first workpiece, the first plate shaped positioning portion including a recessed inverted portion and a protruding portion arranged at a leading end portion of the first plate shaped positioning portion, wherein the recessed inverted portion is recessed from a reference surface of the first plate shaped positioning portion and the protruding portion protrudes from the recessed inverted portion; and
   a second plate shaped positioning portion provided on the second workpiece, the second plate shaped positioning portion including a protruding inverted portion and a receiving portion arranged at a leading end portion of the second plate shaped positioning portion, wherein the protruding inverted portion protrudes from a reference surface of the second plate shaped positioning portion and the receiving portion is an opening formed in the protruding inverted portion,
   the first plate shaped positioning portion and the second plate shaped positioning portion positioning the first workpiece with respect to the second workpiece, by overlapping the leading end portion of the first plate shaped positioning portion face-to-face with the leading end portion of the second plate shaped positioning portion,
   when the recessed inverted portion of the first plate shaped positioning portion is overlapped with the protruding inverted portion of the second plate shaped positioning portion (1) the receiving portion of the second plate shaped positioning portion engages with the protruding portion provided on the first plate shaped positioning portion and (2) portions of the second plate shaped positioning portion excluding the protruding inverted portion are overlapped with portions of the first plate shaped positioning portion excluding the recessed inverted portion.

2. The positioning structure according to claim 1, wherein the alignment of the first and second plate shaped positioning portions of the first and second workpieces being inverted is the alignment of the first and second plate shaped positioning portions of each of the first and second workpieces being arranged to realize a positional relationship that is reversed from the positional relationship of the workpieces; and
   the protruding portion being provided toward the overlapping side is the protruding portion being provided on a surface opposing the second plate shaped positioning portion when the first plate shaped positioning portion is overlapped with the second plate shaped positioning portion.

3. The positioning structure according to claim 1, further comprising a fixing portion provided on the first plate shaped positioning portion, wherein the fixing portion is arranged on a far side of the first plate shaped positioning portion and continuous with the protruding portion, and engages with the end portion of the second plate shaped positioning portion when the first plate shaped positioning portion is overlapped with the second plate shaped positioning portion.

4. The positioning structure according to claim 3, further comprising:
   a stopper portion provided on the first plate shaped positioning portion,
   wherein the stopper portion is arranged on an opposite side of the fixing portion from the end portion of the first plate shaped positioning portion, and is provided on a surface opposing the second plate shaped positioning portion when the first plate shaped positioning portion is overlapped with the second plate shaped positioning portion.

5. The positioning structure according to claim 1, further comprising a fixing portion provided on the first plate shaped positioning portion, wherein the fixing portion is arranged on an opposite side of the protruding portion from the end portion of the first plate shaped positioning portion, and engages with the end portion of the second plate shaped positioning portion when the first plate shaped positioning portion is overlapped with the second plate shaped positioning portion.

6. The positioning structure according to claim 1, further comprising:
   a stopper portion provided on the first plate shaped positioning portion; and
   a fixing portion provided on the first plate shaped positioning portion,
   wherein the stopper portion is arranged on an opposite side of the fixing portion from the end portion of the first plate shaped positioning portion, and is provided on a surface opposing the second plate shaped positioning portion when the first plate shaped positioning portion is overlapped with the second plate shaped positioning portion.

7. The positioning structure according to claim 1, further comprising a guide portion provided on the end portion of the second plate shaped positioning portion, wherein the guide portion has a cup shape that matches a top surface of the protruding portion provided on the first plate shaped positioning portion.

8. The positioning structure according to claim 1, wherein the protruding portion is an annular flange portion that extends toward the overlapping side; and the receiving portion engages with the annular flange portion provided on the first plate shaped positioning portion when the first plate shaped positioning portion is overlapped with the second plate shaped positioning portion.

9. The positioning structure according to claim 8, further comprising a guide portion provided on the end portion of the second plate shaped positioning portion, wherein the guide portion guides the annular flange portion provided on the first plate shaped positioning portion to the receiving portion provided on the second plate shaped positioning portion.

10. The positioning structure according to claim 1, wherein the protruding portion has an annular flange portion provided opposite the second plate shaped positioning portion when the first plate shaped positioning portion is overlapped with the second plate shaped positioning portion, and the receiving portion engages with the annular flange portion provided on the first plate shaped positioning portion when the first plate shaped positioning portion is overlapped with the second plate shaped positioning portion.

11. The positioning structure according to claim 1, wherein each of the first and second workpieces is a press-formed article.

12. A positioning method for positioning a first workpiece having a first positioning portion with respect to a second workpiece having a second positioning portion, by overlapping a leading end portion of the first positioning portion face-to-face with a leading end portion of the second positioning portion, the first positioning portion provided with a recessed inverted portion at a leading end portion thereof and the second positioning portion provided with a protruding inverted portion at a leading end portion thereof, so that alignment of the positioning portion of each workpiece is inverted when the first positioning portion is overlapped with the second positioning portion, the recessed inverted portion including a protruding portion, and the protruding inverted portion including a receiving portion that engages with the protruding portion, the positioning method comprising:
  bringing the first positioning portion of the first workpiece and the second positioning portion of the second workpiece close together, with the leading end portion of the first positioning portion face-to-face with the leading end portion of the second positioning portion, and overlapping the recessed inverted portion with the protruding inverted portion; and
  engaging the protruding portion provided on the recessed inverted portion with the receiving portion provided on the protruding inverted portion, so that portions of the second positioning portion excluding the protruding inverted portion are overlapped with portions of the first positioning portion excluding the recessed inverted portion.

13. The positioning method according to claim 12, further comprising engaging the end portion of the second positioning portion with a fixing portion provided on the first positioning portion.

14. The positioning method according to claim 12, wherein the protruding portion is an annular flange portion provided on the first positioning portion, and engages the annular flange portion with the receiving portion provided on the second positioning portion.

* * * * *